Nov. 27, 1923.          1,475,400
F. KRUSE
MEAT PRESS AND EJECTOR
Filed Sept. 5, 1922          2 Sheets-Sheet 1
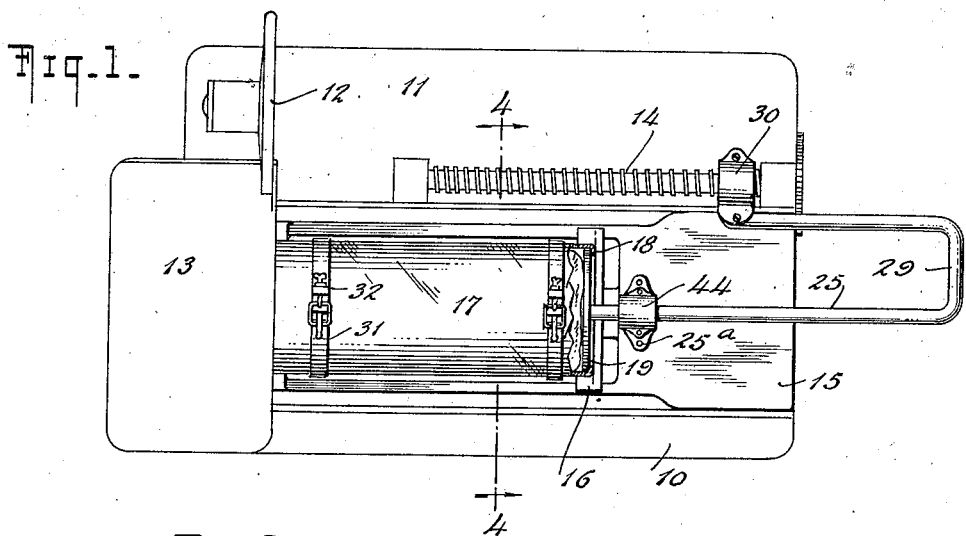
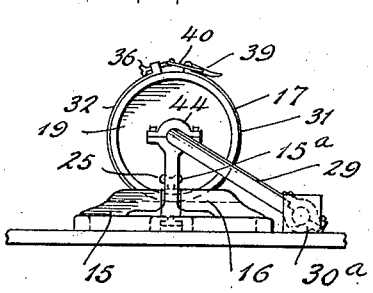
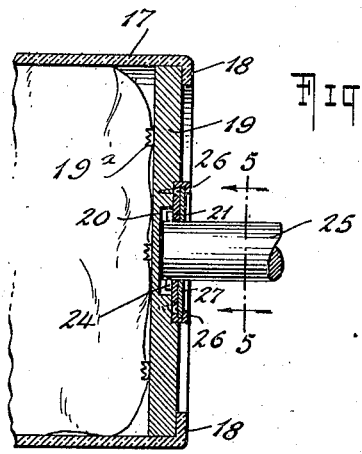
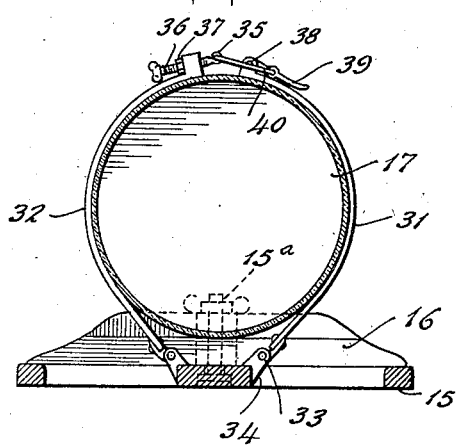
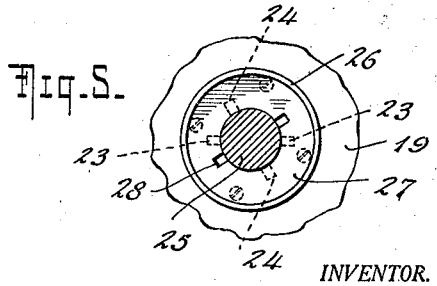
INVENTOR.
FERDINAND KRUSE
BY
ATTORNEYS

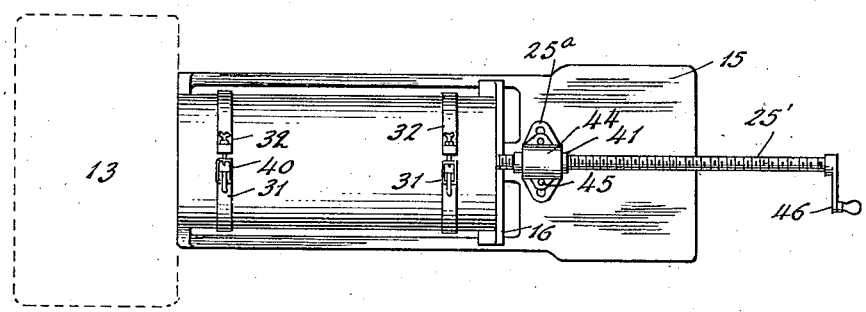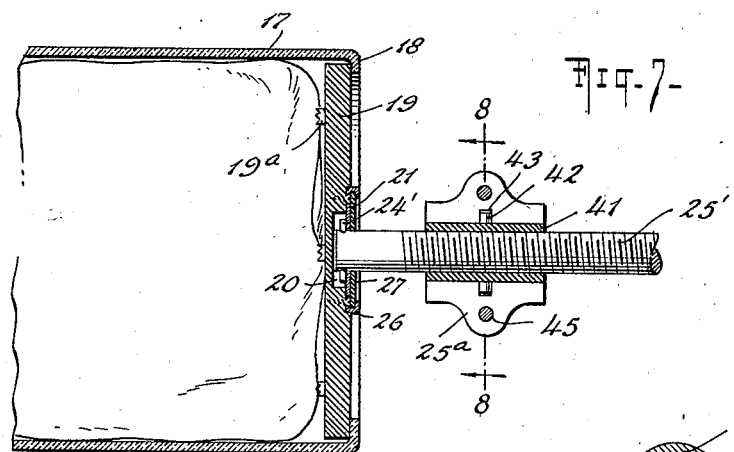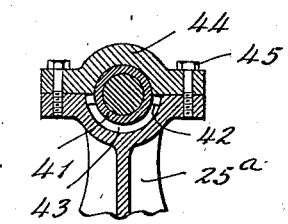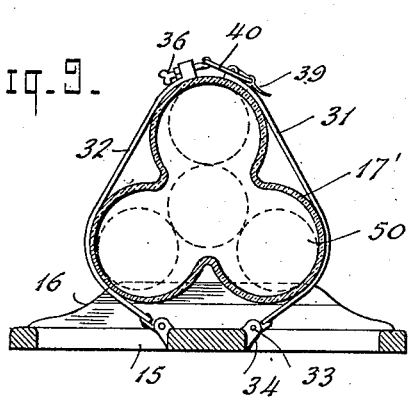

Patented Nov. 27, 1923.

1,475,400

UNITED STATES PATENT OFFICE.

FERDINAND KRUSE, OF PORT RICHMOND, NEW YORK.

MEAT PRESS AND EJECTOR.

Application filed September 5, 1922. Serial No. 586,091.

*To all whom it may concern:*

Be it known that I, FERDINAND KRUSE, a citizen of the United States, residing at Port Richmond, county of Richmond, and State of New York, have invented certain new and useful Improvements in Meat Presses and Ejectors, of which the following is a specification.

The principal object of this invention is to provide a meat container and ejector of the type disclosed in my prior Patent #1350160 granted August 17th, 1920, and adapted to be used as an attachment to a meat slicing machine. A more specific object is to improve upon the construction shown in the said patent.

A further object is to provide means for attaching the device to a slicing machine whereby the operating mechanism of the slicing machine is used to automatically feed the contents of the container to the slicing knife.

Another object is to detachably mount the slicing machine attachment upon the device and to provide an interchangeable attachment to replace the slicing machine attachment when it is desired to use the container with an ordinary butcher's knife.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification

Fig. 1 is a plan view of my invention, with the slicing machine attachment in place.

Fig. 2 is an end view of the parts shown in Fig. 1.

Fig. 3 is an enlarged sectional detail of the movable bottom or ejecting plate of the container.

Fig. 4 is a section on the line 4—4 of Fig. 1.

Fig. 5 is a section on the line 5—5 of Fig. 3.

Fig. 6 is a plan view of the container with the hand feeding attachment connected thereto.

Fig. 7 is an enlarged sectional detail showing the manner of securing the hand feeding attachment.

Fig. 8 is a sectional detail on the line 8—8 of Fig. 7 and

Fig. 9 shows a modification of the configuration of container for stuffed casings of smaller diameters.

Referring to Figs. 1 to 5 of the drawings, the numeral 10 indicates any suitable supporting structure upon which is mounted the slicing machine 11 having the usual rotating knife 12 adapted when the machine is actuated to reciprocate across the delivery table 13. These slicing machines are usually provided with a feeding carriage upon which the meat is placed and which is intermittently fed towards the rotating knife by a worm or screw 14, suitable gearing (not shown) being provided to actuate the screw. According to my invention, the feeding carriage is replaced by a base 15 preferably of cast metal upon which is adjustably secured as by the bolt $15^a$ a pair of saddles 16 in which is adapted to be received the meat container 17, which is a hollow glass cylinder provided at one end with an annular flange 18. Slidably mounted within the container is a circular disc 19 which acts as a closure for one end of the container and also serves as a piston to force or eject the contents of the container towards the slicing knife 12.

The inner face of the disc is preferably provided with a plurality of prongs $19^a$ to grip and hold the meat while the outer face of the disc 19 is recessed at its central portion as indicated by the numeral 20 which recess is partially closed by the plate 21. The plate 21 is provided with a central aperture and leading outwardly from the aperture are the key ways 23 to permit the passage of the pins 24 which project laterally from the circumference of a feeding rod 25.

The outer circumference of the plate 21 is provided with a plurality of hooks 26 which engage about a locking plate 27. The locking plate is also provided with a plurality of key ways 28 which when aligned with the key ways 23 permit the passage of the pins 24 but which when rotated to the position shown in Fig. 5 prevent detachment of the feeding rod 25.

The rod 25 extends rearwardly through bearing bracket 25ᵃ and is bent laterally as indicated at 29 and then forwardly and terminates in a nut 30 which engages with the screw 14 whereby the rod 25 and consequently the disc 19 will be fed forwardly by rotation of the screw, the nut 30 is preferably formed with a removable lower section 30ᵃ to permit detachment of the rod from the screw 14.

Means are provided for clamping the container securely upon the base 15 and comprises one or more clamping bands consisting of the half sections 31 and 32 pivotally mounted as at 33 in the lugs 34 projecting from the base. The free end of section 32 has mounted therein a hook 35 formed upon one end of the bolt 36 a lock nut 37 being provided to lock the catch in adjusted position, while the free end of section 31 has pivoted thereto as at 38 a quick releasing device comprising an actuating lever 39 to which is pivoted a catch member 40. The construction of the quick releasing device being such that the pivotal point of the catch member 40 will pass a dead center point and hold the clamping device securely in engagement with the container.

The operation of the device described above is as follows, the container 19 which has been filled with the meat is placed within the saddles 16 and the clamping sections 31 and 35 are then secured in place by means of the locking device 35 to 40 inclusive. The locking plate 27 is then rotated to bring the keyways 23, 28 into alignment after which the rod 25 is inserted into the aperture 22, the pins 24 passing through the key ways and into the recess 20. The rod 25 is now turned downwardly until the nut 30 engages the screw 14 and the lower nut section 31 is secured in place to maintain the nut in engagement with the screw.

The locking plate 27 is again rotated to lock the pins 24 within the recess 20 to prevent longitudinal displacement of the rod from the disc and the removable cap 44 of the bearing bracket is secured in place. It will be obvious that as the machine is operated the rotation of the screw 14 will cause the rod 25 to push the contents of the cylindrical container outwardly into contact with the rotary knife.

Referring now to Figs. 6 to 8, a hand operated feeding device is shown substituted for the rod 25 and comprises an internally threaded sleeve 41 having the pins 42 projecting outwardly therefrom to engage within the slot 43 in the inner face of the bracket 25ᵃ and prevent movement of the sleeve longitudinally of the bracket. A removable cap 44 is secured as by the bolts 45 to permit detaching and attaching the rod 25 shown in Figs. 1 to 5 and the substitution of the threaded rod 25'. One end of the rod 25' is provided with pins 24' to engage within the recess 20 of the disc and the other end has secured thereto the handle 46 by the rotation of which the meat is fed forward and out of the container as desired.

In Fig. 9 is shown a three lobed form of a container 17' adapted to be used for sausages or other similar stuffed meat casings the diameter of which is considerably less than that of the cylindrical container shown in the preceding figures. The outer dimensions of the container 17' are proportioned to permit the substitution of container 17' for the cylindrical container whereby the same clamping bands will grip either form. If the sausages are much smaller than the diameter of one of the lobes 50, a sausage may be placed in the center of the container and a plurality of casings grouped around the central one as indicated in the dotted lines in Fig. 9, thereby permitting a number of pieces of sausage to be cut simultaneously. It will be understood that when the three lobed form of container is used that a similarly formed disc would be substituted for the circular disc 19.

The containers are filled at the meat packing plants and delivered to the retailer in the container thus thoroughly protecting the contents from contamination, and as the meat can always be retained in the container there is no necessity for any direct handling thereof, thus the contents of the container is not only always maintained in an absolutely sanitary condition, but the meat is also kept fresher and is prevented from becoming hard and dry.

Having thus described my invention, what I claim as new and desire to secure by Letters Patent of the United States is:—

1. A combined meat container and ejector adapted to be used as an attachment to a slicing machine, comprising a base, a pair of saddles carried by said base, a hollow container mounted in said saddles, means to clamp said container to said base, an ejector disc slidably mounted within said container, said ejector disc provided with means to secure the contents of said container thereto and means to rigidly connect said ejector disc with the operating mechanism of the slicing machine to cause said ejector disc to feed the contents of said container towards the knife of the slicing machine.

2. A combined meat container and ejector adapted to be used as an attachment to a slicing machine comprising a base, a pair of saddles carried by said base, a hollow container mounted in said saddles, means to clamp said container to said base, an ejector disc slidably mounted within and serving as a closure for one end of said container, the inner face of said disc provided with means to secure the contents of the container thereto and the outer face of said disc provided with means to detachably connect a feeding rod to said disc and means carried by said base to support said feeding rod.

3. A combined neat container and ejector adapted to be used as an attachment to a slicing machine comprising a base, a pair of saddles carried by said base, a hollow container mounted in said saddles, means to clamp said container to said base, an ejector disc slidably mounted within said container, means to secure the contents of the container to the inner face of said disc, a recess in the outer face of the disc adapted to rotatably receive a feeding rod and means to secure said rod against longitudinal displacement from said recess.

4. A combined meat container and ejector adapted to be used as an attachment to a slicing machine comprising a base, a pair of saddles carried by said base, a hollow container mounted in said saddles, adjustable quick release means to clamp said container to said base, an ejector disc slidably mounted within said container and serving as a closure for one end thereof, said disc provided on its inner face with means to engage and hold the contents of the container, a feeding rod, means carried by said base to support said rod and the outer face of said disc provided with means to detachably secure said feeding rod thereto.

In testimony whereof I have affixed my signature.

FERDINAND KRUSE.